INVENTOR.
ERIC LAWRENCE CASLING WHITE.
BY H. S. Grover
ATTORNEY.

INVENTOR.
ERIC LAWRENCE CASLING WHITE.
BY H. G. Grover
ATTORNEY.

Patented Mar. 21, 1950 2,501,368

UNITED STATES PATENT OFFICE 2,501,368

FREQUENCY STABILIZED RELAY FOR FREQUENCY-MODULATED OSCILLATIONS

Eric Lawrence Casling White, Iver, England, assignor to Electric & Musical Industries Limited, Hayes, Middlesex, England, a company of Great Britain Application March 3, 1945, Serial No. 580,821
In Great Britain March 25, 1944

4 Claims. (Cl. 250—15)

Figure 1:
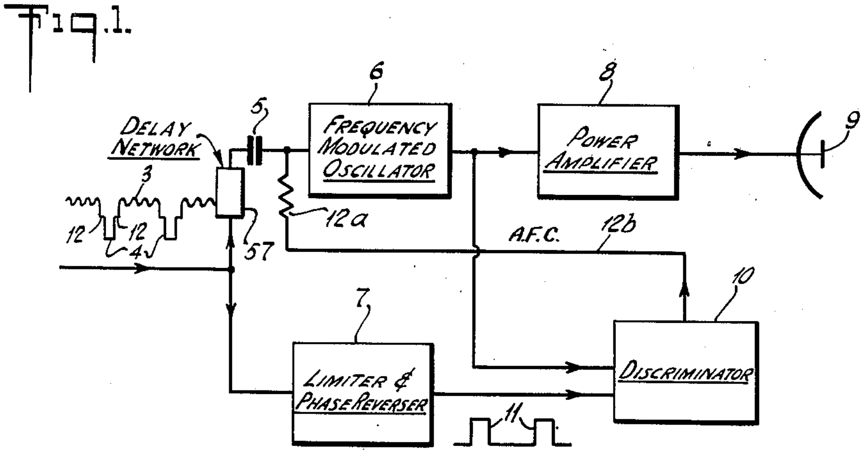

This invention relates to apparatus for transmitting or receiving frequency-modulated oscillations.

It is well known that a transmitter for transmitting frequency-modulated oscillations is somewhat unstable in its operation and is usually provided with some form of automatic control for maintaining the frequency of the carrier oscillations substantially constant. Where the signals which are employed to modulate the carrier oscillations are of alternating form, it is readily possible to effect an automatic-frequency control by observing the mean frequency of the carrier oscillations and should this mean frequency depart from its desired value to apply a control to the transmitter to restore the frequency to its proper value. However, in television signals, no definite mean frequency is available since the frequency of the signals depends, as is well known, on the average brightness of the individual images being transmitted, it being usually the practice to reinsert prior to transmission any D. C. components which may have been lost in the signal circuits. With television signals therefore, it is not possible to apply the known forms of automatic-frequency control owing to the absence of a mean frequency which can be stabilised by some automatic control. Similar difficulties arise when signals of the above form are received and whilst, in general, with apparatus for receiving frequency-modulated signals it is possible to effect automatic-frequency control to correct either for drift in the frequency of the received oscillations or to correct for a varying frequency of the local oscillator of the receiver if the latter is of the superheterodyne type by the use of known forms of discriminating circuits which observe the mean frequency of the signals, such expedients are not possible in cases where the receiver is intended to receive signals which have no definite mean frequency.

It is the object therefore of the present invention to provide an improved apparatus for controlling the frequency of frequency-modulated oscillations without reference to the mean frequency of the oscillations.

In television signals it is usually the practice to transmit with the picture signals, signals having a datum value. These signals of datum value may either be the synchronising signals which have a fixed amplitude with respect to "black" in the transmitted signals or, alternatively, such signals may comprise "black signals" occurring just prior to or just after the occurrence of a synchronising signal. In employing television signals of this form to modulate the frequency of a carrier oscillation it will be appreciated that the frequency of the modulated signals of said datum value for stable operation should be constant assuming that any lost D. C. components have been reinserted prior to effecting frequency modulation. In the present invention these signals of datum value are employed for stabilising the frequency of the frequency-modulated oscillations.

According to the invention apparatus for controlling the frequency of frequency-modulated oscillations which include signals of datum value which should have a constant frequency is provided comprising a frequency discriminator circuit arranged to be switched into operation when the signals of datum value occur and to respond to said signals to afford an output, and means for applying said output to adjust the frequency of said oscillations to render the frequency of said signals more nearly constant than would otherwise be the case. Means may be provided for smoothing the output of the discriminator circuit to cause said output to remain effective for adjusting said frequency substantially throughout the interval between successive signals of datum value.

In transmitting apparatus for transmitting, for example, television signals, and including apparatus according to the present invention, the output of the discriminator circuit may be applied to control the frequency of the oscillator which affords the frequency-modulated oscillations and in frequency-changing apparatus which serves to derive oscillations of different frequency from the original frequency-modulated oscillations, the discriminator output may be applied to control the frequency of a local oscillator which affords oscillations for combining with the frequency-modulated oscillations to afford further frequency-modulated oscillations of changed frequency.

Figure 3:
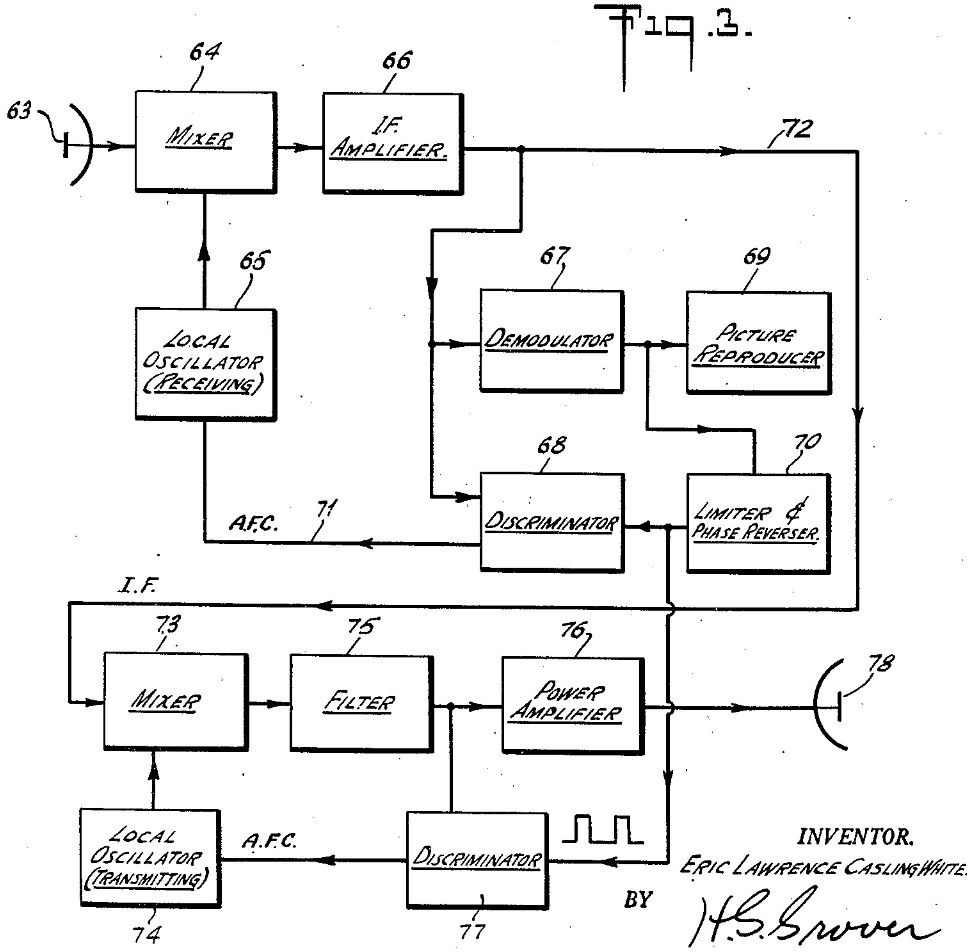
Figure 2:
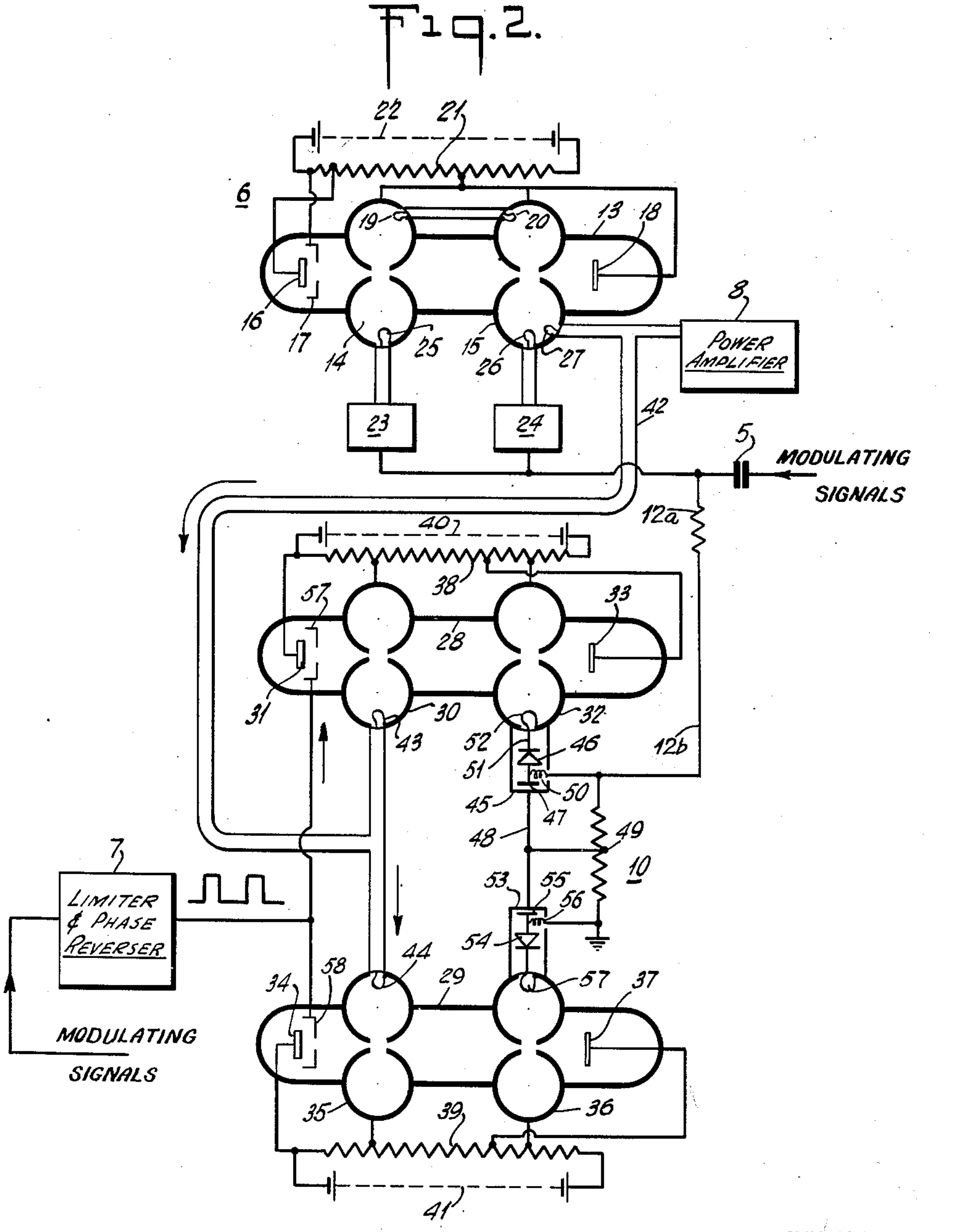

In order that the said invention may be clearly understood and readily carried into effect it will now be more fully described with reference to the accompanying drawings, in which:

Figure 1 is a block diagram illustrating schematically an arrangement for transmitting frequency-modulated television signals and including apparatus according to the invention for stabilising the frequency of the carrier oscillations, Figure 2 indicates diagrammatically in more detail a preferred form of a frequency-modulated oscillator and a preferred form of discriminator employed in Figure 1, and Figure 3 is a block diagram of a receiver for frequency-modulated television signals combined with a transmitter for re-transmitting the received signals such as may be employed in link transmission in which the receiver and transmitter both include frequency stabilising apparatus according to the invention.

Referring first to Figure 1 of the drawings, the reference numeral 3 indicates the waveform of television signals just prior to the application of signals to the frequency-modulated oscillator of the transmitter. The picture signals are interspersed with synchronising signals indicated at 4 which have a constant amplitude with respect to black in the transmitted signals assuming that any D. C. components which may have been lost in the signal circuits have been reinserted. The synchronising signals, after having frequency-modulated the carrier oscillations should therefore have a constant frequency, but if the frequency of the carrier oscillations should drift this frequency of the synchronising signals will no longer be constant. In the arrangement shown in Figure 1 the frequency of the synchronising signals is observed and if the frequency of the synchronising signals departs from the proper value, a control potential is generated which is fed to the carrier frequency generator so as to restore the frequency of the generator to its proper value. The picture signals and synchronising signals shown in Figure 1 are fed on the one hand through a blocking condenser 5 to the frequency-modulated oscillator 6, and on the other hand to separating means in the form of a limiter and phase-reverser 7. The output from the frequency-modulated oscillator 6 is fed on the one hand to a power amplifier 8, the output of which is fed to a transmitting aerial 9 and on the other hand to a discriminator circuit indicated at 10. The limiter and phase-reverser 7 serves to remove, by limiting, the picture signals leaving only the synchronising signals and also reverses the phase of the synchronising signals before they are fed to the discriminator 10. The signals fed to the discriminator 10 are indicated at 11 and are employed to switch the discriminator into operation so as to observe the frequency of the modulated oscillations at times when the synchronising signals occur. The discriminator 10 is arranged to provide a control potential if the frequency of the synchronising signals departs from its correct value, said control potential being fed back via the lead 12b and resistance 12a to the oscillator 6 so as to adjust the frequency of the generated oscillations to the correct value. The control potential is suitably smoothed so as to remain effective at least until the next signal of the same datum value occurs.

Since the picture and synchronising signals are fed through the condenser 5 to the oscillator 6 it is possible that some of the D. C. components of the signals may be lost by virtue of the condenser 5, in which case it will be necessary to reinsert the lost D. C. components prior to frequency-modulating the oscillations and in such case the control potential obtained from the discriminator 10 may be used as a correcting potential for addition to the D. C. potential required for reinserting the lost D. C. components.

Figure 2 of the drawings illustrates one form of frequency-modulated oscillator which can be employed in the circuit shown in Figure 1, this frequency-modulated oscillator being similar to that disclosed in co-pending application Serial No. 533,854, now U. S. Patent No. 2,464,549, granted March 15, 1949. The oscillator is of the velocity-modulated type and comprises, as shown, a discharge device having an evacuated envelope 13 and a pair of hollow resonators 14 and 15 through which an electron beam emanating from a cathode 16 is caused to pass. The cathode 16 is associated with a cathode shield 17 and after the electrons have passed through the resonators 14 and 15 the beam is collected by an electrode 18. The two resonators 14 and 15 are coupled together so as to function as a regenerative oscillator by means of coupling loops 19 and 20. If desired, however, the resonators 14 and 15 may be coupled together in any other suitable manner. In operation of the device the cathode 16 is maintained at a negative potential, for example, by connecting it to a tapping point on a potentiometer 21 connected across a source of potential 22 whilst the cathode shield 17 may be maintained at a more negative potential, as shown. The resonators 14 and 15 are maintained at a positive potential with respect to the cathode 16 whilst the electrode 18 is maintained at the same potential as that of the resonators 14 and 15 or at a slightly negative potential with respect thereto. The electron beam emanating from the cathode 16 in passing through the resonator 14 becomes velocity-modulated and in the drift space between the resonators 14 and 15 the beam becomes charge-density-modulated and the energy of the beam is then imparted to the resonator 15 as the beam passes therethrough to be collected by the electrode 18. Due to the coupling between the resonators, the device functions to generate self-maintained oscillations at the frequency to which the resonators 14 and 15 are tuned. In order to effect frequency modulation of the generated oscillations the tuning of both the resonators 14 and 15 is varied in any suitable manner. The means shown in Figure 2 for varying the tuning of the resonators comprises variable impedances 23 and 24 which are coupled to the resonators 14 and 15 via coupling loops 25 and 26 respectively. The variable impedances 23 and 24 may each comprise a reactance tube to which the modulating signals 3 are fed via the condenser 5, said signals serving to vary the magnitudes of the reactances afforded by said tubes so that the tuning of both resonators 14 and 15 is varied at the modulation frequency. The frequency-modulated oscillations thus generated are fed from the resonator 15 via a coupling loop 27 to the power amplifier 8.

The discriminator 10, where the frequency of the transmitted oscillations has a value which permits of the use of conventional tuned circuits, may comprise a pair of such circuits feeding a detector in known manner. Where, however, the frequency of oscillations is very high, such as would be the case when using a frequency-modulated oscillator of the form described with reference to Figure 2, the discriminator circuit shown also in Figure 2 is preferably employed. As shown, the discriminator comprises a pair of velocity-modulated amplifier electron discharge devices 28 and 29, the device 28 comprising an input resonator 30 which serves to impart velocity-modulation to a beam of electrons emanating from a cathode 31, the beam after being velocity-modulated by the resonator 30 becoming charge-density-modulated in the drift space between the resonator 30 and output resonator 32, the beam in passing through the resonator 32 imparting energy thereto before being finally collected on an electrode 33. The discharge device 29 is similar to the device 28 and comprises a cathode 34, input resonator 35, output resonator 36 and collecting electrode 37. In operation of the devices 28 and 29 each cathode 31 and 34 may be maintained at negative potentials by connecting said cathodes to tapping points on potentiometers 38 and 39 connected respectively across sources of potentials 40 and 41, the resonators 30 and 35 being maintained at positive potentials with respect to their respective cathodes and the resonators 32 and 36 at more positive potentials than the associated resonators 30 and 35. The collecting electrodes 33 and 37 may be maintained at negative potentials with respect to the resonators 32 and 36. Modulated oscillations from the output of the oscillator 6 are fed by a suitable line, such as a concentric line 42, to the resonators 30 and 35, the line 42 terminating in coupling loops 43 and 44, as shown. The input resonators 30 and 35 are therefore excited at the same frequency so that the electron beams in both devices are velocity-modulated at the same frequency whereby the output resonators 32 and 36 are likewise excited at the same frequency. The resonators 30 and 35 are preferably tuned to the frequency of excitation but the resonators 32 and 36 are tuned respectively to frequencies above and below the frequency at which they are excited so that the outputs obtainable from the resonators 32 and 36 will vary in opposite sense as the frequency of excitation approaches, or recedes from, the frequency to which either resonator 32 or 36 is tuned.

The output from the resonator 32 is fed through a section 45 of coaxial transmission line to a rectifier, shown as a crystal detector 46, which is connected on one side through a capacity 47 and a lead 48 connected to the end closure of the transmission line 45 to the mid-point of a load impedance 49, and through a choke 50 to one end of the load impedance 40 and at its other side via the central conductor 51 of the transmission line section 45 to a loop 52 disposed within the resonator 32 for picking up energy when the resonator 32 is excited. The transmission line section 45 has a length effectively equal to a quarter of a wavelength of the frequency of excitation so that variations in the impedance in the crystal detector do not affect substantially the tuning of the resonator 32.

The output resonator 36 of the device 29 has an output circuit similar to that of the resonator 32 and includes a section of coaxial transmission line 53, crystal detector 54, capacity 55, choke 56 and the half of the load impedance 49 not included in the output circuit of the resonator 32. With this arrangement the output of the resonators 32 and 36 rectified by the detectors 46 and 54 respectively will be combined differentially in the load impedance thus affording a rectified output, the magnitude and sense of which will depend on the departure of the frequency of excitation of the resonators 32 and 36 from the mean of the frequency to which said two resonators are tuned. The differential output appearing across the load resistance 49 is fed via the lead 12b to the impedances 23 and 24 so as to adjust the frequency of oscillations generated in the modulator 6 so as to maintain said frequency substantially constant. In order to switch the devices 28 and 29 into operation at the appropriate times to observe the frequency of the synchronising signals, the output from the limiter and phase reverser 7 is fed to control electrodes 57 and 58 provided in the devices 28 and 29 respectively.

The discriminator 10 shown in Figure 2 of the drawings may be employed for purposes other than that described. For example, it may be employed for detecting frequency-modulation of received oscillations, said received oscillations being applied to the resonators 30 and 35. In this case the output appearing across the load impedance 49 will be the desired modulation output and may be applied with or without amplification to actuate suitable reproduction apparatus or may be used for other purposes.

Although in Figure 1 frequency control is effected by observing in discriminator 10 the frequency of the synchronising signals which have minimum values, the television signals may also include other signals of datum value indicated at 12 which may occur, for example, just prior to and/or just after the occurrence of a synchronising signal. These signals 12 should also have a constant frequency in the transmitted signals and if desired the discriminator 10 may be employed to observe frequency of the signals 12, instead of the frequency of the synchronising signals 4. The signals 11 may be employed to switch the discriminator 10 into operation, the signals 11 or the signals fed from the oscillator 6 to the discriminator 10 being suitably delayed so that the discriminator 10 is switched into operation at the appropriate times. In Figure 1 the signals fed to the oscillator 6 are delayed by a conventional delay network indicated by the reference numeral 57. It will also be appreciated that where the synchronizing signals employed have maximum values instead of minimum values as described above, the separating means which is used to afford pulses for switching the discriminator into operation would be arranged accordingly to respond only to peak positive excursions in the signals.

Figure 3 of the drawings is a block diagram of an arrangement for use in a link transmitter where signals are received, amplified and retransmitted. In the case of receivers for frequency-modulated oscillations, not only for use with a link transmitter as shown in Figure 3, but also for use as a domestic or other television receiver, it is necessary to effect a control to compensate for the drift in the transmitted signals or for drift in the local oscillator of the receiver. As shown in Figure 3, television signals received on an aerial 63 are fed to a mixer 64 for reducing the frequency of the received signals to an intermediate frequency by mixing the signals with local oscillations derived from oscillator 65. The intermediate frequency output of the mixer 64 is fed to an intermediate frequency amplifier 66 the output of which is fed to a demodulator 67 and to a discriminator 68. The output from the demodulator 67 may be fed to a picture reproducer 69 which in a link transmitter may be a picture monitor or in a domestic receiver a viewing cathode ray tube. The output from the demodulator is also fed to a limiter and phase-reverser 70 which functions in the manner of the limiter and phase-reverser 7 of Figure 1 to provide switching signals for application to the discriminator 68. The discriminator 68 may be of the conventional type having circuits tuned respectively above and below the frequency of the synchronising signals 4 (Figure 1) or the frequency of the signals 12 (Figure 1), the output of the discriminator 68 thus providing a control voltage for application by lead 71 to the local oscillator 65 for adjusting a frequency of such oscillator so that the frequency of the signals 4 or 12 is adjusted to the correct intermediate frequency. The output from the intermediate frequency amplifier 66, where the arrangement is employed as a link transmitter, is also fed via lead 72 to a further mixer 73 where the signals are mixed with local oscillations from an oscillator 74 for converting the intermediate frequency signals from the amplifier 66 to a frequency suitable for re-transmission. The local oscillator 74 will also require its frequency to be stabilised with respect to the signals 4 or 12 and accordingly the output from the mixer 73 is fed through a filter 75 the output of which is fed on the one hand to a power amplifier 76 and on the other hand to a discriminator 77. The discriminator 77 is switched into operation to observe the frequency of the signals 4 or 12 by the signals derived from the limiter and phase-reverser 70, the output of the discriminator 77 providing a control voltage which is applied to the local oscillator 74. The frequency of the modulated oscillations from the amplifier 76 is thus stabilised prior to re-transmitting the signals by the aerial 78.

Although the invention has been described above as applied to the transmission or reception of television signals which have interspersed signals of datum value, it will be appreciated that the invention is also applicable for the transmission or reception of signals other than television signals which do not have a mean frequency but which are interspersed with signals of datum value.

I claim:

1. In apparatus for stabilizing the frequency of operation of an oscillation generator and modulating the frequency of the oscillations generated in accordance with signals including a signal component having a recurring maximum or minimum value which should produce a generated frequency which is of a substantially constant recurring value, but the frequency of which may drift including, a source of signals of the character described coupled to said generator for controlling the frequency of operation of the same in accordance with said signals, apparatus controlled by said signals for producing potentials representing said component of maximum or minimum value, a coupling to said last named apparatus for feeding the signals thereto, means excited by potentials corresponding to said signals for producing a potential characteristic of changes in said maximum or minimum value, a coupling between said first named apparatus and said means for putting said means into operation when said signal component occurs, a time delay network in said first coupling, and means for stabilizing the frequency of operation of said oscillation generator in accordance with the said produced characteristic potential.

2. In a system for generating frequency modulated carrier currents for transmission, an oscillation generator, a source of signals including a signal component of a datum value which should be constant and produce a frequency modulated wave a recurring frequency of which should be constant, a time delay network coupling said source to said generator, a frequency discriminator and detector coupled to said generator to be excited by said modulated wave, a current amplitude limiter excited by potentials characteristic of said signals for separating therefrom said component of datum value, a phase reverser coupled to said limiter, and means coupling said phase reverser to said discriminator and detector for rendering the same operative during the time periods when said signal components of datum value occur.

3. In a signaling system, a source of oscillatory energy of carrier wave frequency modulated in accordance with signals including a recurring component of a datum value which should be fixed, a local source of oscillatory energy, means for modulating oscillatory energy from the local source including means for mixing the output of said modulated source with oscillations from said local source, means for selecting from said mixing means a difference frequency the frequency of which is modulated in a manner corresponding to the modulations on said first source, and means for stabilizing the frequency of the oscillatory energy being modulated comprising means excited by said selected modulated oscillatory energy, for deriving a control potential characteristic of variations in said datum value, and means excited by potentials corresponding to said signals for rendering said means for deriving operative at the time at which said component of datum value appears.

4. In a signaling system, a source of oscillatory energy of carrier wave frequency modulated in accordance with signals including a recurring component of a datum value which should be fixed, a local source of oscillatory energy, means for modulating oscillatory energy from the local source including means for mixing the output of said modulated source with oscillations from said local source, means for selecting from said mixing means a difference frequency the frequency of which is modulated in a manner corresponding to the modulations on said first source, means for stabilizing the frequency of the oscillatory energy being modulated comprising means excited by said selected modulated oscillatory energy, for deriving a control potential characteristic of variations in said datum value, means excited by potentials corresponding to said signals for rendering said means for deriving operative at the time at which said component of datum value appears, a local oscillator, a mixer excited by oscillations therefrom and by oscillations of said selected frequency, means for stabilizing the frequency of said oscillator, and means for transmitting the output of said mixer.

ERIC LAWRENCE CASLING WHITE.

REFERENCES CITED

The following references are of record in the file of this patent:

UNITED STATES PATENTS

| Number | Name | Date |
|---|---|---|
| 2,121,103 | Seeley | June 21, 1938 |
| 2,250,532 | Hansell | July 29, 1941 |
| 2,259,690 | Hansen et al. | Oct. 21, 1941 |
| 2,264,608 | Armstrong | Dec. 2, 1941 |

(Other references on following page)

UNITED STATES PATENTS

| Number | Name | Date |
|---|---|---|
| 2,275,486 | Armstrong | Mar. 10, 1941 |
| 2,280,824 | Hansen et al. | Apr. 28, 1942 |
| 2,290,517 | Wilson | July 21, 1942 |
| 2,312,079 | Crosby | Feb. 23, 1943 |
| 2,312,783 | Trevor | Mar. 2, 1943 |
| 2,334,189 | Goldstine | Nov. 16, 1943 |
| 2,341,649 | Peterson | Feb. 15, 1944 |
| 2,354,510 | Earp | July 25, 1944 |
| 2,369,268 | Trevor | Feb. 13, 1945 |
| 2,413,939 | Benware | Jan. 7, 1947 |
| 2,414,100 | Hansen | Jan. 14, 1947 |
| 2,425,013 | Stotz | Aug. 5, 1947 |

FOREIGN PATENTS

| Number | Country | Date |
|---|---|---|
| 445,350 | Great Britain | Apr. 6, 1936 |